2,986,564
PYRROLE COMPOUNDS

Richard Rips, 21 rue de la Tour d'Auvergne, Paris, France, and Hoï Nguyen Phuc Buu, % Radium Institute, 26 rue d'Ulm, Paris, France No Drawing. Filed Feb. 20, 1959, Ser. No. 794,507

11 Claims. (Cl. 260—313)

This invention relates to aryl pyrrole compounds, notably the 1-substituted aryl; aminoetheroxides, aminothioethers, and aminoesters derived from pyrrole, and to the methods for synthesizing this class of compounds. More particularly, this invention relates to compounds of the formula

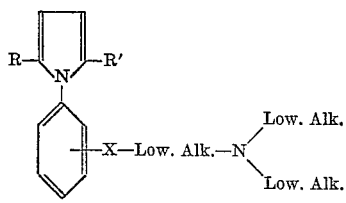

where

R is a member of the group consisting of methyl and phenyl.
R' is a member of the group consisting of methyl and phenyl.
X is a member of the group consisting of S, O,

The several lower alkyl radicals need not be identical; the term lower alkyl is intended to include both the straight and branched chain $C_1$–$C_8$ alkyl radicals. They may, for example, be methyl, ethyl, propyl, isopropyl, butyl, isobutyl, pentyl, hexyl, heptyl, octyl, isooctyl, etc.

The compounds to which this invention relate are useful because of their various pharmacological properties. Notably, they are active as antispasmodics (particularly musculotropic), analgesics, tranquilizers, anesthetics and hypotensives. Thus, for example, neutral aqueous solutions of these compounds can be administered intramuscularly or intraperitoneally. Since the amino compounds of the instant invention are basic in character they can, if desired, be utilized in the form of their acid addition salts, notably the hydrochloride, or of their quaternary ammonium salts. Thus, the hydrochlorides of 1-(2-β-diethyl-aminoetheroxy phenyl) 2-methyl-5-phenyl pyrrole, and -5 methyl pyrrole have exhibited many times the activity of papaverine. In general the amino pyrroles where X is ortho to the pyrrole ring seem to have a higher activity than the corresponding meta or para positioned compounds.

Synthesis of the aminoetheroxides, aminothioethers and aminoesters of the instant invention is accomplished in two principal steps in the following manner.

(a) Condensation of a gamma diketone with an aromatic amine bearing ortho, meta or para, a phenolic, thiophenolic or carboxylic group. The condensation with a phenol, for example, results in a hydroxy-aryl 1-pyrrole compound.

(b) Then reaction of the alkali metal salt of the condensation product with an aminoalkyl chloride which is di-substituted on the amino group with the desired $C_nH_{n+1}$ radicals.

By and large the reaction sequence is as follows:

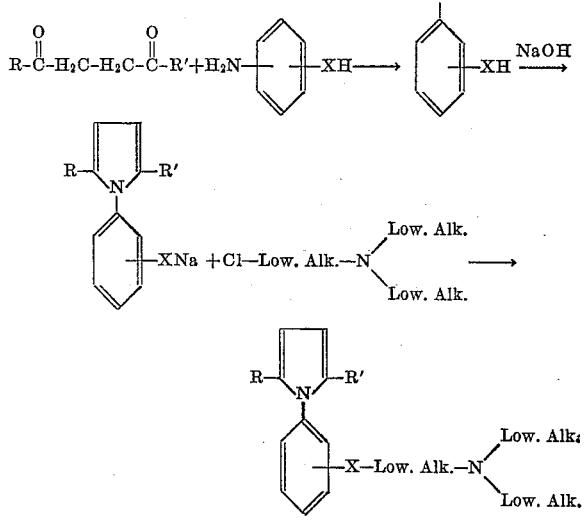

where R, R' and X are as previously identified.

Acid addition salts of the amino pyrrole compounds of the instant invention, and acids such as, for example, hydrochloric, sulfuric, phosphoric, acetic, citric and other acids, can be prepared readily by reacting the amino compound in solution, e.g., chloroform, with the desired acid and then removing the solvent.

In addition the amino pyrrole compounds of the instant invention also form quaternary ammonium salts by reaction with alkyl halides according to well known techniques for quaternizing tertiary amines by, for example, reaction with benzyl chloride.

Only the non-toxic acid addition and quaternary ammonium salts are, of course, administrable as pharmaceuticals.

The following examples illustrate the detailed practice of the instant process and the novel compounds prepared thereby.

EXAMPLE I

*Synthesis of 1-(2-β-diethylaminoethoxyphenyl)-2,5-dimethyl-pyrrole*

(a) In a distillation flask of appropriate size, an equimolar mixture of o-aminophenol and acetonylacetone is gently brought to the boil, elimination of water vapor occurs, and after approximately two hours of boiling, the water has been entirely distilled off. The 1-(2-hydroxyphenyl)-2,5-dimethylpyrrole formed thereby is then distilled in vacuo. The yield, regardless of the quantities used to begin with, is always of the order of 90%. B.P. 149° C./18 mm., straw-colored liquid, crystallizing spontaneously in the receptor flask in colorless needles, M.P., 102° C.

*Analysis.*—Calcd. for $C_{12}H_{13}NO$: C, 76.9; H, 7.0; N, 7.9. Found: C, 76.8; H, 7.0; N, 7.5.

(b) One mole of the foregoing compound is dissolved in ethyl alcohol; one mole+10% in excess is added of an alcoholic solution of caustic soda (or potash); the mixture is boiled for a few minutes to accomplish the formation of the alkali salt, then left to cool. One mole+10% excess of diethylaminoethyl chloride is then added, the mixture left to react 10 minutes, then boiled for one hour, then poured into water, extracted with chloroform, washed thoroughly with water, the solvent distilled, and the residue fractionated in vacuo. B.P. 189–190° C./16 mm., $n_D^{22}$ 1.5430. Yield: 90%.

*Analysis.*—Calcd. for $C_{18}H_{26}N_2O$: C, 75.5; H, 9.1; N, 9.8. Found: C, 75.5; H, 9.1; N, 9.6. Hydrochloride, M.P. 188° C.

EXAMPLE II

*1-(2-β-diethylaminoethoxyphenyl)-2-methyl-5-phenyl pyrrole*

(a) Condensation of phenacylacetone on o-aminophenol according to the procedure of Example Ia furnishes 1-(2-hydroxyphenyl) - 2 - methyl - 5-phenylpyrrole, B.P. 202° C./15 mm., M.P. 115° C.

*Analysis.*—Calcd. for $C_{17}H_{15}NO$: C, 81.9; H, 6.1. Found: C, 81.9; H, 6.2.

(b) Following the procedure of Example Ib, the sodium salt of the preceding compound gives on boiling with diethylaminoethyl chloride, the required diethylaminoetheroxide, B.P. 232° C./13 mm., $n_D^{20}$ 1.6025.

Hydrochloride, M.P. 138° C.

EXAMPLE III

*1-(2-β-diethylaminoethoxyphenyl)-2,5-diphenyl-pyrrole*

(a) Condensation of dibenzoylethane with o-aminophenol according to the procedure of Example Ia affords 1-(2-hydroxyphenyl)-2,5-diphenylpyrrole, B.P. 240° C./11 mm. M.P. 183° C.

(b) The diethylaminoetheroxide of the foregoing compound is obtained in the same way as for Examples I and II; it boils at 279° C./22 mm.; hydrochloride, M.P. 175° C.

*Analysis.*—Calcd.: N, 12.97. Found: N, 12.94.

In the same manner as in Example Ia, acetonylacetone is condensed with p-aminophenol forming the analogous p-hydroxylated compound, B.P. 178° C./12 mm., whose diethylaminoethylic etheroxide, prepared as described in Example Ib above, has B.P. 200° C./13 mm., $n_D^{21}$ 1.5501.

Other substituted chains have been prepared in the same manner. Starting with the 1-(2-hydroxyphenyl)-2,5-dimethylpyrrole of Example Ia there has been prepared the:

Dimethylaminopropylic etheroxide, B.P. 174–176° C./17 mm., $n_D^{25}$ 1.5551; hydrochloride, M.P. 180° C.
Dimethylaminoisopropylic etheroxide, B.P. 177° C., $n_D^{27.5}$ 1.5536; hydrochloride, M.P. 151–152° C.
Diisopropylaminoethylic etheroxide, B.P. 185° C./15 mm., $n_D^{27}$ 1.6079; hydrochloride, M.P. 142.5° C.
Dimethylaminoethylic etheroxide, B.P. 176–178° C./16 mm., $n_D^{28}$ 1.5585; hydrochloride, M.P. 173° C.

EXAMPLE IV

*1-(2-diethylaminoethiophenyl)-2,5-dimethylpyrrole*

(a) Condensation of acetonylacetone with o-mercaptoaniline according to the procedure of Example Ia furnishes 1 - (2 - mercaptophenyl)-2,5-dimethylpyrrole, B.P. 151° C./19 mm., $n_D^{21}$ 1.6138.

(b) Its sodium salt condenses readily with diethylaminoethyl chloride following the procedure of Example Ib to form the desired thioether, B.P. 187–190° C./18 mm., $n_D^{27}$ 1.6079; hydrochloride, M.P. 149–150° C.

EXAMPLE V

*Diethylaminoethyl ester of 2-(2,5-dimethylpyrryl) benzoic acid*

(a) Condensation of acetonylacetone with o-aminobenzoic acid according to the procedure of Example Ia affords 2-(2,5-dimethylpyrryl) benzoic acid, B.P. 195° C./14 mm.

(b) Its dimethylaminoethyl ester, formed by condensation of its sodium salt with diethylaminoethyl chloride according to the procedure of Example Ib boils at 217° C./17 mm., $n_D^{17}$ 1.5432; hydrochloride, M.P. 121° C.

What is claimed is:

1. A compound selected from the group consisting of (a) 1-substituted pyrroles having the formula

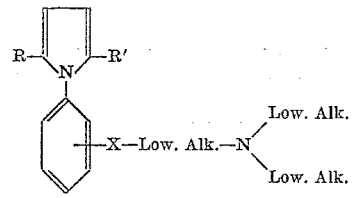

where R and R' are each members selected from the group consisting of methyl and phenyl; where X is a member selected from the group consisting of O, S and

(b) non-toxic acid addition salts thereof; and (c) non-toxic benzyl quaternary ammonium salts thereof.

2. A non-toxic acid addition salt of 1-(2-β-diethyl aminoethoxyphenyl)-2 methyl-5 phenyl pyrrole.

3. A non-toxic acid addition salt of 1-(2-β-diethylaminoethoxyphenyl)-2,5-dimethyl pyrrole.

4. A non-toxic acid addition salt of 1-(2-β-diethylaminoethoxyphenyl)-2,5-diphenyl pyrrole.

5. A non-toxic acid addition salt of 1-(2-β-diisopropyl aminoethoxyphenyl)-2,5-dimethyl pyrrole.

6. A non-toxic acid addition salt of the diethylamino ethylthioether of 1-(2-mercaptophenyl)-2,5-dimethyl pyrrole.

7. 1-(2-β - diethylaminoethoxyphenyl) - 2 methyl - 5 pheny pyrrole.

8. 1 - (2 - β - diethylaminoethoxyphenyl)-2,5-dimethyl pyrrole.

9. 1 - (2 - β - diethylaminoethoxyphenyl)-2,5-diphenyl pyrrole.

10. 1 - (2 - β - diisopropylaminoethoxyphenyl) - 2,5 dimethyl pyrrole.

11. The diethylaminoethylthioether of 1-(2-mercaptophenyl)-2,5-dimethyl pyrrole.

References Cited in the file of this patent
UNITED STATES PATENTS 2,410,783    Hardman _____ Nov. 5, 1946

FOREIGN PATENTS 271,776    Switzerland _____ Feb. 16, 1951